United States Patent
Lu et al.

(10) Patent No.: US 11,573,485 B2
(45) Date of Patent: Feb. 7, 2023

(54) PROJECTOR, 3D SENSING MODULE AND METHOD FOR FABRICATING THE PROJECTOR

(71) Applicant: HIMAX TECHNOLOGIES LIMITED, Tainan (TW)

(72) Inventors: Yin-Dong Lu, Tainan (TW); Chih-Yu Chuang, Tainan (TW); Shi-Jen Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 733 days.

(21) Appl. No.: 16/559,564

(22) Filed: Sep. 3, 2019

(65) Prior Publication Data
US 2021/0063859 A1 Mar. 4, 2021

(51) Int. Cl.
*G03B 21/20* (2006.01)
*G03B 21/14* (2006.01)
*G05B 11/32* (2006.01)

(52) U.S. Cl.
CPC ......... *G03B 21/2033* (2013.01); *G03B 21/14* (2013.01); *G03B 21/145* (2013.01); *G05B 11/32* (2013.01); *G06T 2200/04* (2013.01)

(58) Field of Classification Search
CPC .. G03B 21/2033; G03B 21/14; G03B 21/145; G03B 17/54; G03B 35/08; G05B 11/32; G06T 2200/04; G02B 30/00; G01S 17/89; H05K 1/18; H05K 3/341; H05K 9/0022
See application file for complete search history.

(56) References Cited

U.S. PATENT DOCUMENTS

| 10,823,973 | B2 * | 11/2020 | Ma | G02B 27/0944 |
|---|---|---|---|---|
| 2016/0284920 | A1 * | 9/2016 | Saugier | H01L 31/0203 |
| 2018/0188105 | A1 * | 7/2018 | Huang | H01L 31/02002 |
| 2019/0131767 | A1 | 5/2019 | Lee et al. | |
| 2020/0014172 | A1 * | 1/2020 | Kuo | H01S 5/0235 |
| 2020/0285139 | A1 * | 9/2020 | Ma | H05K 1/0296 |
| 2021/0185804 | A1 * | 6/2021 | Huang | H05K 1/0274 |
| 2022/0117086 | A1 * | 4/2022 | Kwak | H05K 1/0243 |

FOREIGN PATENT DOCUMENTS

| CN | 208351232 U | * | 1/2019 | G03B 17/54 |
|---|---|---|---|---|
| CN | 109683439 A | | 4/2019 | |
| CN | 110034072 A | | 7/2019 | |
| TW | I658756 B | | 5/2019 | |

* cited by examiner

*Primary Examiner* — Magda Cruz
(74) *Attorney, Agent, or Firm* — CKC & Partners Co., LLC

(57) ABSTRACT

A projector, a 3D sensing module and a method for fabricating the projector are provided. The 3D sensing module includes the projector and a receiver. The projector is configured to project a light beam to an object, and the receiver is configured to receive the light beam reflected from the object. The projector includes a circuit board, electronic components, a holder and a lens module. The circuit board has a plurality of first bonding pads and a plurality of second bonding pads on a top surface of the circuit board. The electronic components are bonded on the first bonding pads. The holder has a cavity and third bonding pads bonded on and electrically connected to the second bonding pads. The lens module is disposed in the cavity of the holder.

20 Claims, 4 Drawing Sheets

PROJECTOR, 3D SENSING MODULE AND METHOD FOR FABRICATING THE PROJECTOR

BACKGROUND

Field of Invention

The present invention relates to a projector, a 3D sensing module and a method for fabricating the projector.

Description of Related Art

Three-dimensional (3D) stereoscopic image technology is generally applied in various fields such as broadcasting, gaming, animation, virtual reality, etc. To obtain a 3D stereoscopic image of an object, a 3D sensing module for performing 3D sensing technology such as Time of Flight (TOF) technology or Structured Light technology is required. However, the fabrication process of the 3D sensing module is too complex and results in high fabrication cost of the 3D sensing module.

SUMMARY

Embodiments of the present invention provide a projector. The projector includes a circuit board, electronic components, a holder and a lens module. The circuit board has first bonding pads and second bonding pads on a top surface of the circuit board. The electronic components are bonded on the first bonding pads. The holder has a cavity and third bonding pads on a bottom surface of the holder, in which the third bonding pads are bonded on and electrically connected to the second bonding pads, thereby securing the holder on the circuit board. The lens module is disposed in the cavity of the holder.

In some embodiments, the bottom surface of the holder has a concave portion for receiving one of the electronic components.

In some embodiments, the projector further includes an electromagnetic interference (EMI) shielding plate disposed on the concave portion of the bottom surface of the holder.

In some embodiments, the electromagnetic interference shielding plate is electrically connected to at least one of the third bonding pads.

In some embodiments, the second bonding pads are electrically grounded to enable the electromagnetic interference shielding plate to be electrically grounded through the at least one of the third bonding pads.

In some embodiments, the one of the electronic components is a driver chip for vertical-cavity surface-emitting laser (VCSEL).

In some embodiments, the second bonding pads are disposed adjacent to edges of the top surface of the circuit board, and the first bonding pads are surrounded by the second bonding pads.

In some embodiments, the third bonding pads are disposed adjacent to edges of bottom surface of the holder.

From another aspect, embodiments of the present invention provide a 3D sensing module. The 3D sensing module includes a projector and a receiver. The projector is configured to project a light beam to an object, and the receiver is configured to receive the light beam reflected from the object. The projector includes a circuit board, electronic components, a holder and a lens module. The circuit board has first bonding pads and second bonding pads on a top surface of the circuit board. The electronic components are bonded on the first bonding pads. The holder has a cavity and third bonding pads on a bottom surface of the holder, in which the third bonding pads are bonded on and electrically connected to the second bonding pads, thereby securing the holder on the circuit board. The lens module is disposed in the cavity of the holder.

In some embodiments, the bottom surface of the holder has a concave portion for receiving one of the electronic components.

In some embodiments, the projector further includes an electromagnetic interference (EMI) shielding plate disposed on the concave portion of the bottom surface of the holder.

In some embodiments, the electromagnetic interference shielding plate is electrically connected to at least one of the third bonding pads.

In some embodiments, the second bonding pads are electrically grounded to enable the electromagnetic interference shielding plate to be electrically grounded through the at least one of the third bonding pads.

In some embodiments, the one of the electronic components is a driver chip for vertical-cavity surface-emitting laser (VCSEL).

In some embodiments, the second bonding pads are disposed adjacent to edges of the top surface of the circuit board, and the first bonding pads are surrounded by the second bonding pads.

In some embodiments, the third bonding pads are disposed adjacent to edges of bottom surface of the holder.

From further another aspect, embodiments of the present invention provide a method for fabricating a projector. In this method, at first, a circuit board, electronic components and a holder are provided. The circuit board has a plurality of first bonding pads and a plurality of second bonding pads on a top surface of the circuit board, and the holder has a cavity and a plurality of third bonding pads on a bottom surface of the holder. Then, a bonding process is performed by using surface mounted technology (SMT) to bond the electronic components to the first bonding pads and to bond the third bonding pads of the holder to the second bonding pads of the circuit board, thereby enabling the holder to be secured on the circuit board.

In some embodiments, in the bonding process, at first, solder is placed on the first bonding pads and the second bonding pads of the circuit board. Then, the electronic components are placed on the first bonding pads. Thereafter, the holder is placed on the circuit board, in which the third bonding pads of the holder are located on the second bonding pads of the circuit board. Then, the solder is heated to enable the electronic components to be bonded on the first bonding pads, and to enable the third bonding pads of the holder to be bonded on the second bonding pads of the circuit board.

In some embodiments, the material of the solder is a tin-lead alloy or a lead-free, tin-based alloy.

In some embodiments, the method for fabricating a projector further including placing a lens module into the cavity of the holder.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
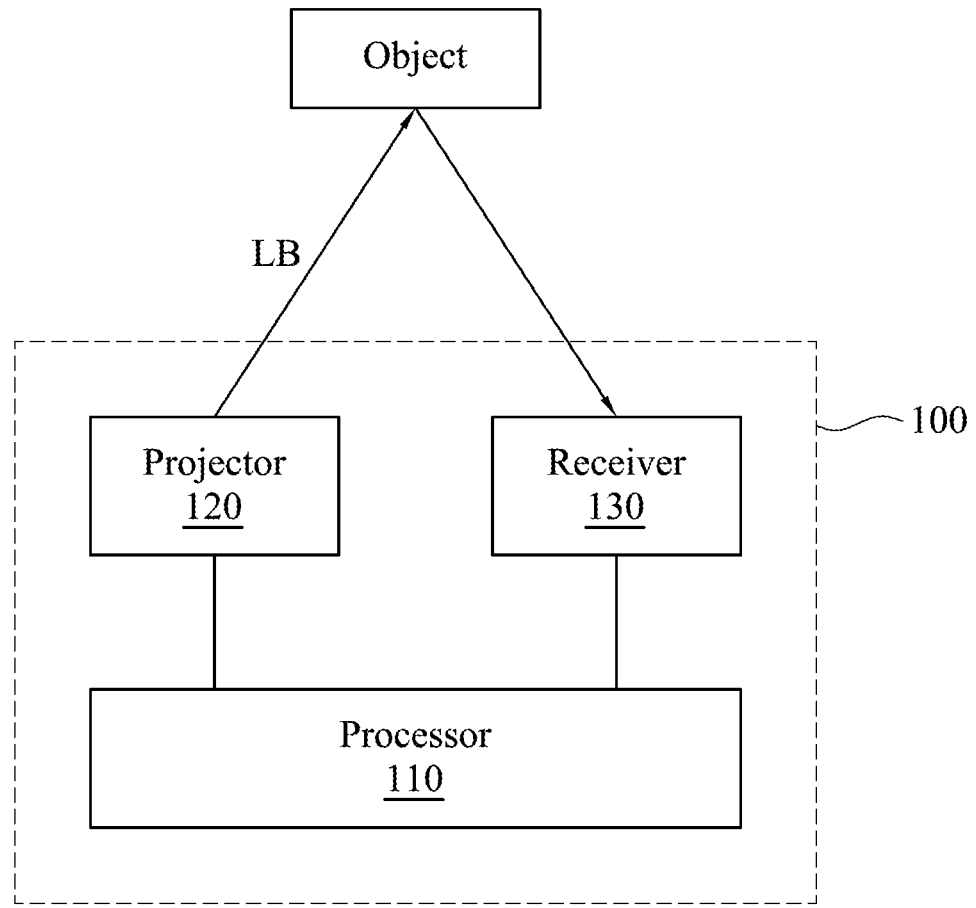
FIG. 1 is a schematic diagram illustrating a 3D sensing module in accordance with an embodiment of the present invention.

FIG. 1 is a schematic diagram illustrating a 3D sensing module 100 in accordance with an embodiment of the present invention. The 3D sensing module 100 includes a processor 110, a projector 120 configured to project a light beam LB to an object, and a receiver 130 configured to receive the light beam LB reflected from the object. In this embodiment, the 3D sensing module 100 applies Time of Flight (TOF) technology perform 3D sensing, and the processor 110 controls the timing of the projector 120 and the receiver 130 to enable its synchronous detection.

Figure 2A:
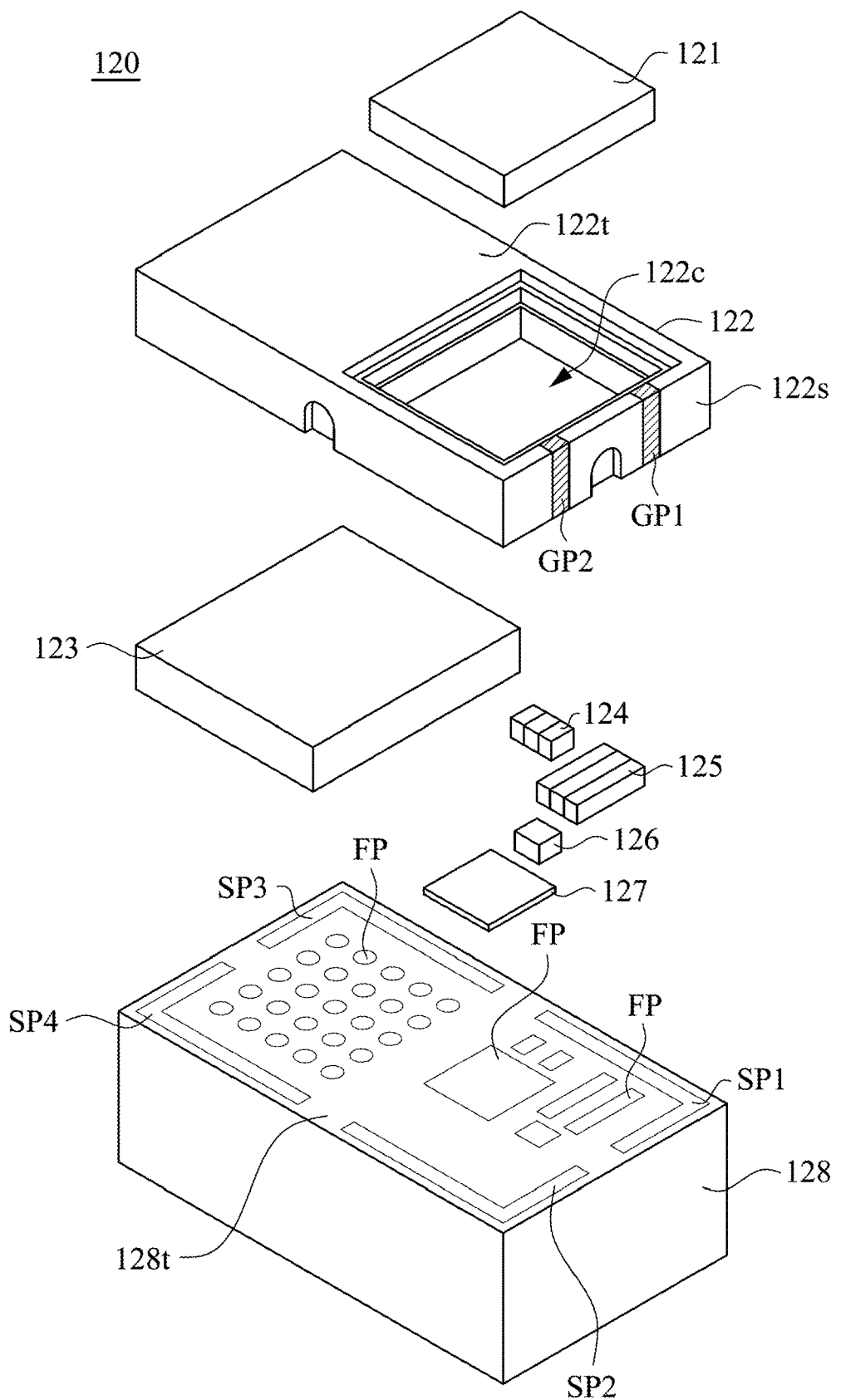
FIG. 2a is an explored view of a projector in accordance with an embodiment of the present invention.
Figure 2B:
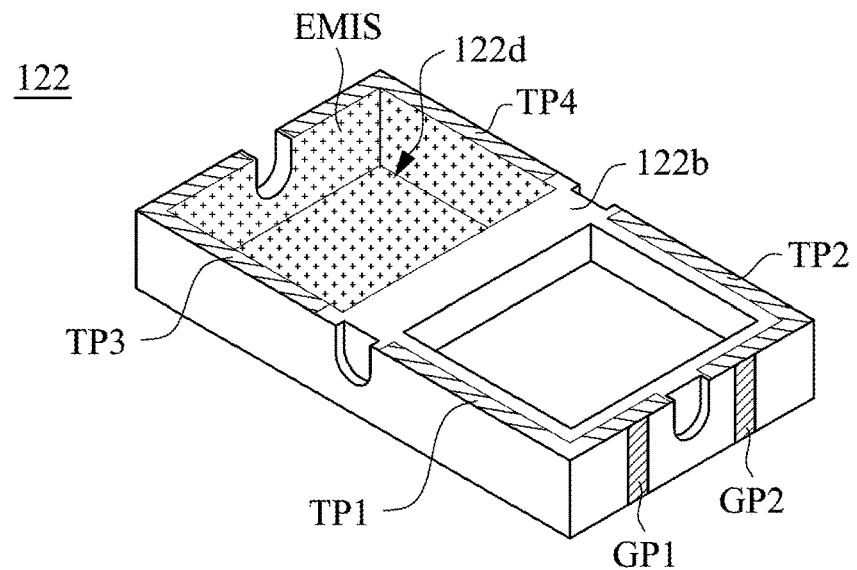
FIG. 2b is a schematic diagram showing a bottom surface of a holder in accordance with an embodiment of the present invention.

Referring to FIG. 2a and FIG. 2b, FIG. 2a is an explored view of the projector 120, and FIG. 2b is a schematic diagram showing a bottom surface of a holder 122. The projector 120 includes a lens module 121, the holder 122, plural electronic components 123-127 and a circuit board 128. The circuit board 128 has plural first bonding pads FP and plural second bonding pads SP1-SP4 on a top surface 128t of the circuit board 128. The electronic components 123-127 are configured to be bonded on the first pads FP. For example, the electronic component 123 is configured to be bonded on the first pads FP each having a circular shape. In this embodiment, the electronic component 127 is a vertical-cavity surface-emitting laser (VCSEL), and the electronic component 127 is a driver chip for VCSEL.

The holder 122 is configured to be disposed on the top surface 128t of the circuit board 128 to protect the electronic components 123-127 from being damaged. The holder 122 has a cavity 122c for receiving the lens module 121. In this embodiment, the lens module 121 includes a diffraction optical element (DOE) and a circuit for detection of the crack of the DOE. The DOE is configured to be disposed on the electronic component 127 to diffuse the laser from the electronic component 127.

As shown in FIG. 2b, the holder 122 has plural third bonding pads TP1-TP4 on a bottom surface 122b of the holder 122. The third bonding pads TP1-TP4 are configured to be bonded and electrically connected to the second bonding pads SP1-SP4 of the circuit board 128, thereby enabling the holder 122 to be secured on the top surface 128t of the circuit board 128. For example, the third bonding pad TP1 is configured to be bonded to the second bonding pad SP1; the third bonding pad TP2 is configured to be bonded to the second bonding pad SP2; the third bonding pad TP3 is configured to be bonded to the second bonding pad SP3; and the third bonding pad TP4 is configured to be bonded to the second bonding pad SP4. Further, in this embodiment, the second bonding pads SP1-SP4 are electrically grounded, and thus the third bonding pad TP1-TP4 are also electrically grounded through the second bonding pads SP1-SP4.

Referring to FIG. 2a and to FIG. 2b simultaneously, the holder 122 further has plural connecting plates GP1 and GP2 disposed on a sidewall 122s of the holder 122. The holder 122 extends from the bottom surface 122b to the top surface 122t, thereby achieving electric connections between the lens module 121 and the third boding pads TP1 and TP2. For example, the connecting plates GP1 is connected to the third bonding pad TP1, and thus the lens module 121 can be electrically grounded though the connecting plates GP1, the third bonding pad TP1 and the second bonding pad SP1. For another example, the connecting plates GP2 is connected to the third bonding pad TP2, and thus the lens module 121 can be electrically grounded though the connecting plates GP2, the third bonding pad TP2 and the second bonding pad SP2.

In addition, an electromagnetic interference (EMI) shielding plate EMIS is disposed on a concave portion 122d of the bottom surface 122b of the holder 122. In this embodiment, the electromagnetic interference shielding plate EMIS covers the concave portion 122d and electrically connected to the third bonding pads TP3 and TP4, thereby enabling the electromagnetic interference shielding plate EMIS to be electrically grounded though the third bonding pads TP3, TP4 and the second bonding pads SP3, SP4. In other embodiments, the electromagnetic interference shielding plate EMIS is electrically connected to at least one of the third bonding pads TP1-TP4, thereby enabling the electromagnetic interference shielding plate EMIS to be electrically grounded.

Figure 3:
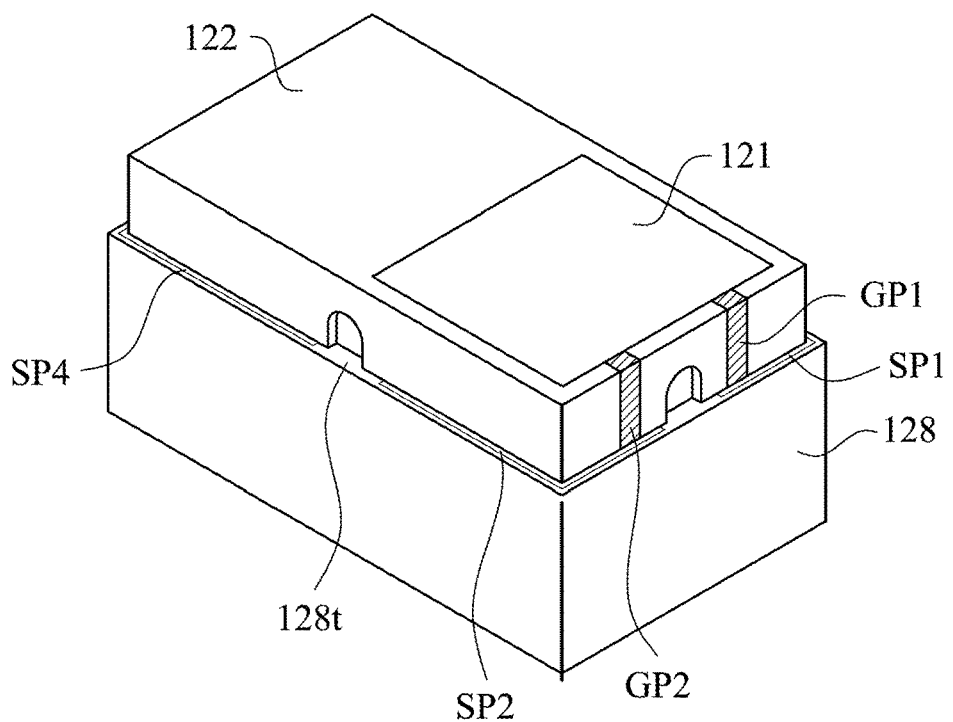
FIG. 3 is a schematic diagram showing a structure of the projector in accordance with an embodiment of the present invention.

Further, the second bonding pads SP1-SP4 are disposed adjacent to edges of the top surface 128t of the circuit board 128 and surrounds the first bonding pads FP. The third bonding pads TP1-TP4 are disposed adjacent to edges of the bottom surface 122b of the holder 122. Therefore, all the electric elements 123-127 bonded on the first bonding pads FP are protected by the holder 122 when the holder 122 is secured on the circuit board 128, as shown in FIG. 3. In this embodiment, the top surface 128t of the circuit board 128 is in a rectangular shape, and the second bonding pads SP1-SP4 are disposed corresponding to vertices of the rectangular shape. Similarly, the bottom surface 122b of the holder 122 is in a rectangular shape, and the third bonding pads TP1-TP4 are disposed corresponding to vertices of the rectangular shape. However, embodiments of the present invention are not limited thereto. Further, in this embodiment, a size of each of the second bonding pads SP1-SP4 is slightly bigger than that of each of the third bonding pads TP1-TP4 to benefit the bonding of the third bonding pads TP1-TP4.

Figure 4:
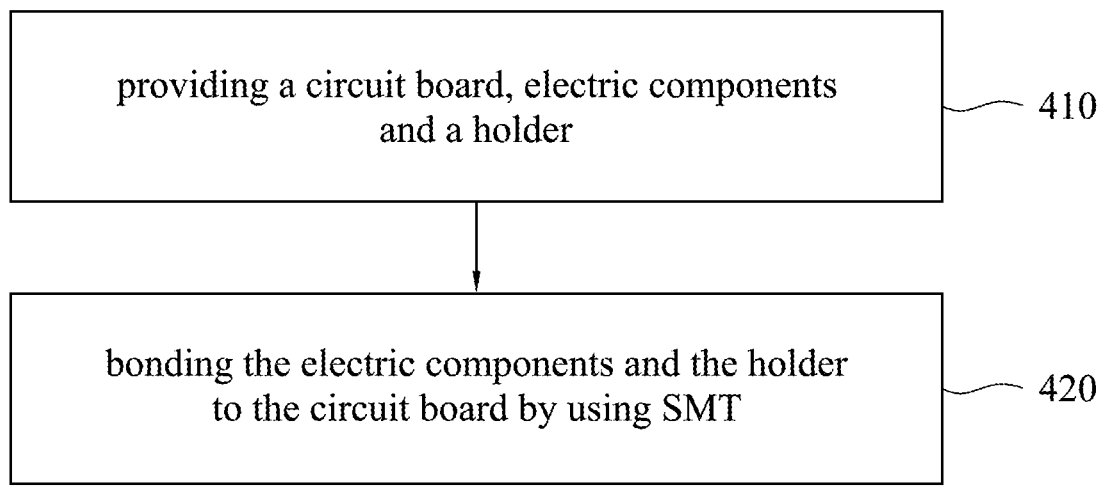
FIG. 4 is a flow chart shown a method for fabricating the projector in accordance with an embodiment of the present invention.

Referring to FIG. 4, FIG. 4 is a flow chart shown a method 400 for fabricating the projector 120. In the method 400, at first, step 410 is performed to provide the holder 122, the electronic components 123-127 and the circuit board 128. Then, step 420 is performed to bond the electronic components 123-127 and the holder 122 to the circuit board 128 by using surface mounted technology (SMT). In step 420, at first, solder is placed on the first bonding pads FP and the second bonding pads SP1-SP4 of the circuit board 128.

Then, the electronic components 123-127 are placed on the first bonding pads FP. Thereafter, the holder 122 is placed on the circuit board 122, in which the third bonding pads TP1-TP4 of the holder 122 are located on the second bonding pads SP1-SP4 of the circuit board 128. Then, the solder is heated to enable the electronic components 123-127 to be bonded on the first bonding pads FP, and to enable the third bonding pads TP1-TP4 of the holder 122 to be bonded on the second bonding pads SP1-SP4 of the circuit board 128. In this embodiment, the material of the solder a tin-lead alloy or a lead-free, tin-based alloy. Further, the lens module 121 can be placed into the cavity 122c of the holder 122 before/after step 420.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projector, comprising:
a circuit board having a plurality of first bonding pads and a plurality of second bonding pads on a top surface of the circuit board;
a plurality of electronic components bonded on the first bonding pads;
a holder having a cavity and a plurality of third bonding pads on a bottom surface of the holder;
a solder disposed between the second bonding pads and the third bonding pads, wherein the solder is adapted by surface mounted technology; and
a lens module disposed in the cavity of the holder;
wherein the third bonding pads are bonded on and electrically connected to the second bonding pads by using the solder, thereby securing the holder on the circuit board.

2. The projector of claim 1, wherein the bottom surface of the holder has a concave portion for receiving one of the electronic components.

3. The projector of claim 2, further comprising an electromagnetic interference (EMI) shielding plate disposed on the concave portion of the bottom surface of the holder.

4. The projector of claim 3, wherein the electromagnetic interference shielding plate is electrically connected to at least one of the third bonding pads.

5. The projector of claim 4, wherein the second bonding pads are electrically grounded to enable the electromagnetic interference shielding plate to be electrically grounded through the at least one of the third bonding pads.

6. The projector of claim 3, wherein the one of the electronic components is a driver chip for vertical-cavity surface-emitting laser (VCSEL).

7. The projector of claim 1, wherein the second bonding pads are disposed adjacent to edges of the top surface of the circuit board, and the first bonding pads are surrounded by the second bonding pads.

8. The projector of claim 1, wherein the third bonding pads are disposed adjacent to edges of bottom surface of the holder.

9. A 3D sensing module, comprising:
a projector configured to project a light beam to an object, wherein the projector comprises:
a circuit board having a plurality of first bonding pads and a plurality of second bonding pads on a top surface of the circuit board;
a plurality of electronic components bonded on the first bonding pads;
a holder having a cavity and a plurality of third bonding pads on a bottom surface of the holder;
a solder disposed between the second bonding pads and the third bonding pads, wherein the solder is adapted by surface mounted technology; and
a lens module disposed in the cavity of the holder; and
a receiver configured to receive the light beam reflected from the object;
wherein the third bonding pads are bonded on and electrically connected to the second bonding pads by using the solder, thereby securing the holder on the circuit board.

10. The 3D sensing module of claim 9, wherein the bottom surface of the holder has a concave portion for receiving one of the electronic components.

11. The 3D sensing module of claim 10, further comprising an electromagnetic interference (EMI) shielding plate disposed on the concave portion of the bottom surface of the holder.

12. The 3D sensing module of claim 11, wherein the electromagnetic interference shielding plate is electrically connected to at least one of the third bonding pads.

13. The 3D sensing module of claim 12, wherein the second bonding pads are electrically grounded to enable the electromagnetic interference shielding plate to be electrically grounded through the at least one of the third bonding pads.

14. The 3D sensing module of claim 11, wherein the one of the electronic components is a driver chip for vertical-cavity surface-emitting laser (VCSEL).

15. The 3D sensing module of claim 9, wherein the second bonding pads are disposed adjacent to edges of the top surface of the circuit board, and the first bonding pads are surrounded by the second bonding pads.

16. The 3D sensing module of claim 9, wherein the third bonding pads are disposed adjacent to edges of bottom surface of the holder.

17. A method for fabricating a projector comprising:
providing a circuit board, a plurality of electronic components and a holder, wherein the circuit board has a plurality of first bonding pads and a plurality of second bonding pads on a top surface of the circuit board, and the holder has a cavity and a plurality of third bonding pads on a bottom surface of the holder; and
performing a bonding process by using a solder disposed between the second bonding pads and the third bonding pads, wherein the solder is adapted by surface mounted technology (SMT) for bonding the electronic components to the first bonding pads and for bonding the third bonding pads of the holder to the second bonding pads of the circuit board, thereby securing the holder on the circuit board.

18. The method of claim 17, wherein the bonding process comprises:
placing the solder on the first bonding pads and the second bonding pads of the circuit board;
placing the electronic components on the first bonding pads;

placing the holder on the circuit board, wherein the third bonding pads of the holder are located on the second bonding pads of the circuit board; and heating the solder to enable the electronic components to be bonded on the first bonding pads, and to enable the third bonding pads of the holder to be bonded on the second bonding pads of the circuit board.

19. The method of claim 18, wherein the material of the solder is a tin-lead alloy or a lead-free, tin-based alloy.

20. The method of claim 17, further comprising:
placing a lens module into the cavity of the holder.

* * * * *